United States Patent
Zhou et al.

(10) Patent No.: US 12,148,134 B2
(45) Date of Patent: *Nov. 19, 2024

(54) METHOD AND SYSTEM FOR IMPROVED VISIBILITY IN BLENDED LAYERS FOR HIGH DYNAMIC RANGE DISPLAYS

(71) Applicant: ATI Technologies ULC, Markham (CA)

(72) Inventors: Jie Zhou, Markham (CA); David I. J. Glen, Toronto (CA)

(73) Assignee: ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,568

(22) Filed: Apr. 28, 2023

(65) Prior Publication Data

US 2023/0267581 A1  Aug. 24, 2023

Related U.S. Application Data

(63) Continuation of application No. 17/069,523, filed on Oct. 13, 2020, now Pat. No. 11,657,483, which is a
(Continued)

(51) Int. Cl.
    *G06K 9/40* (2006.01)
    *G06T 5/92* (2024.01)
    *H04N 23/741* (2023.01)

(52) U.S. Cl.
    CPC .............. *G06T 5/92* (2024.01); *H04N 23/741* (2023.01); *G06T 2207/20208* (2013.01)

(58) Field of Classification Search
    CPC ......... G06T 7/0012; G06T 2207/30004; G06T 2207/30016; G06T 2207/30032;
    (Continued)

(56) References Cited

U.S. PATENT DOCUMENTS 10,832,389 B2 * 11/2020 Zhou ...................... G09G 5/026
11,657,483 B2 *  5/2023 Zhou ...................... G09G 5/377
                                                          382/274
(Continued)

FOREIGN PATENT DOCUMENTS

CN        105009567 A    10/2015
CN        108701438 A    10/2018
(Continued)

OTHER PUBLICATIONS

"HDR to SDR tonemapping"; General—CoreELEC Forums, downloaded from https://discourse.coreelec.org/t/hdr-to-sdr-tonemapping/7567 on Jun. 7, 2024, 7 pgs.
(Continued)

*Primary Examiner* — Duy M Dang
(74) *Attorney, Agent, or Firm* — Volpe Koenig

(57) ABSTRACT

There are many instances where a standard dynamic range ("SDR") overlay is displayed over high dynamic range ("HDR") content on HDR displays. Because the overlay is SDR, the maximum brightness of the overlay is much lower than the maximum brightness of the HDR content, which can lead to the SDR elements being obscured if those elements have at least some transparency. The present disclosure provides techniques including modifying the luminance of either or both of the HDR and SDR content when an SDR layer with some transparency is displayed over HDR content. A variety of techniques are provided. In one example, a fixed adjustment is applied to pixels of one or both of the SDR layer and the HDR layer. The fixed adjustment comprises decreasing the luminance of the HDR layer and/or increasing the luminance of the SDR layer. In another example, a variable adjustment is applied.

20 Claims, 4 Drawing Sheets

Related U.S. Application Data continuation of application No. 16/218,708, filed on Dec. 13, 2018, now Pat. No. 10,832,389.

(58) Field of Classification Search
CPC . G06T 2207/30092; G06T 2207/30096; G06T 2207/30101; G06T 2207/10072; G06T 2207/10081; G06T 2207/20; G06T 2207/20004; G06T 2207/20021; G06T 2207/20012; G06T 2207/20081; G06T 2207/20084; G06T 7/0014; G06T 15/08; G06T 11/008; G06T 7/11; G06T 5/20; G06T 5/50; G06T 5/002; G06T 5/005; G06T 5/006; G06T 2207/20182; G06T 2207/20204; G06T 5/00; G06T 5/007; G06T 5/008; G06T 5/009; G06N 20/00; G06N 3/084; G16H 30/20; A61B 6/463; A61B 6/466; A61B 6/5217; A61B 6/5294; G06K 9/40; G06K 2009/363; H04N 5/367; H04N 5/253; H04N 5/3572; H04N 5/2355; H04N 5/2356; H04N 5/23229

See application file for complete search history.

(56) References Cited

U.S. PATENT DOCUMENTS

| | | |
|---|---|---|
| 2004/0095358 A1 | 5/2004 | Takagi et al. |
| 2013/0148029 A1 | 6/2013 | Gish et al. |
| 2014/0125696 A1 | 5/2014 | Newton et al. |
| 2016/0231889 A1 | 8/2016 | Voss |
| 2017/0018109 A1 | 1/2017 | Aiba |
| 2017/0061625 A1 | 3/2017 | Estrada et al. |
| 2017/0103729 A1 | 4/2017 | Huang et al. |
| 2018/0109850 A1 | 4/2018 | Tsukagoshi |
| 2018/0158210 A1 | 6/2018 | Estrada et al. |
| 2018/0278985 A1 | 9/2018 | De Haan et al. |
| 2018/0322679 A1 | 11/2018 | Kunkel et al. |
| 2018/0338104 A1 | 11/2018 | Pines et al. |
| 2019/0005630 A1 | 1/2019 | Li et al. |
| 2019/0287494 A1 | 9/2019 | Yokota et al. |

FOREIGN PATENT DOCUMENTS

| | | |
|---|---|---|
| JP | 2004172792 A | 6/2004 |
| JP | 2010-507832 A | 3/2010 |
| JP | 2017-005472 A | 1/2014 |
| JP | 2016-062637 A | 4/2016 |
| JP | 2018-503283 A | 2/2018 |
| JP | 2018-060075 A | 4/2018 |
| WO | 2012-172460 A | 12/2012 |
| WO | 2014-130213 | 8/2014 |

OTHER PUBLICATIONS

"Amlogic"; Wikipedia, downloaded from https://en.wikipedia.org/wiki/Amlogic on Jun. 7, 2024, 11 pgs.

Android TV Guide [AndroidTV_Rumor]. "And here, the Reference boards for the new #Amlogic #S905X2 & the more powerful #S922X (Mail-G52 MP4 GPU)." X, Sep. 21, 2018, https://x.com/androidtv_rumor/status/1043076808625856513.

"Amlogic S922X", WikiMovel, downloaded from https://wikimovel.com/index.php/Amlogic_S922X on Jun. 7, 20204, 2 pgs.

\* cited by examiner

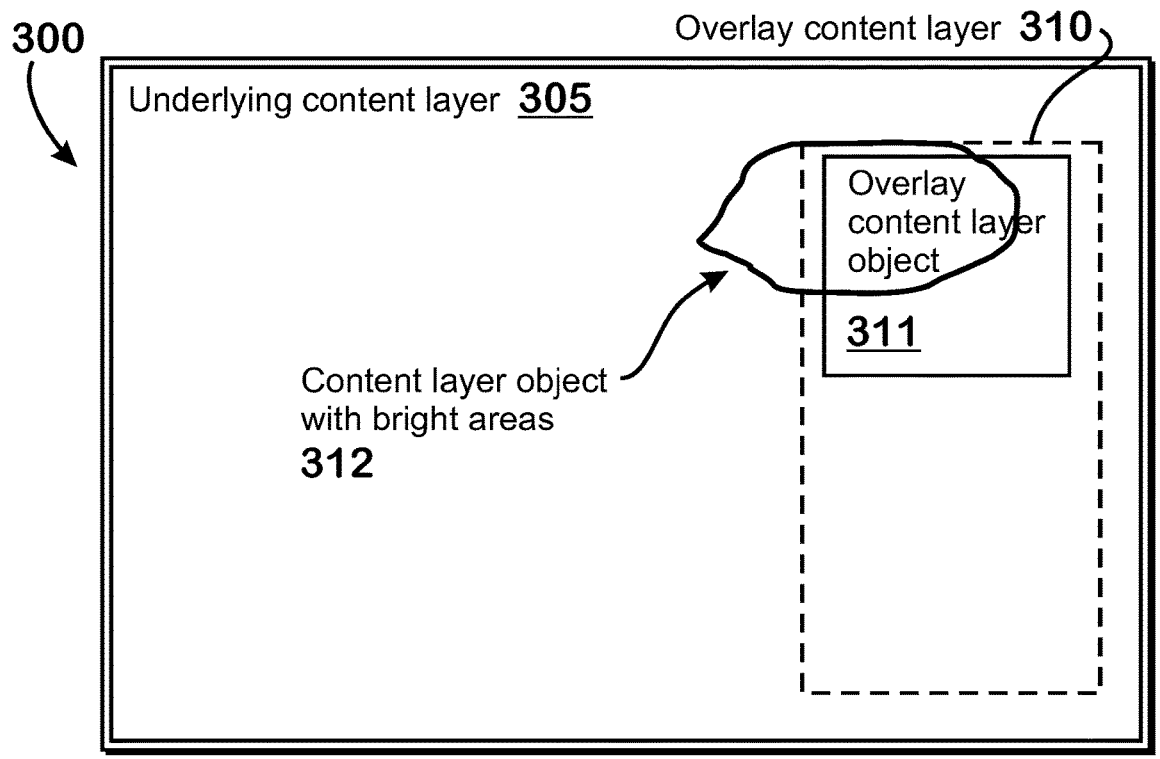
FIG. 3
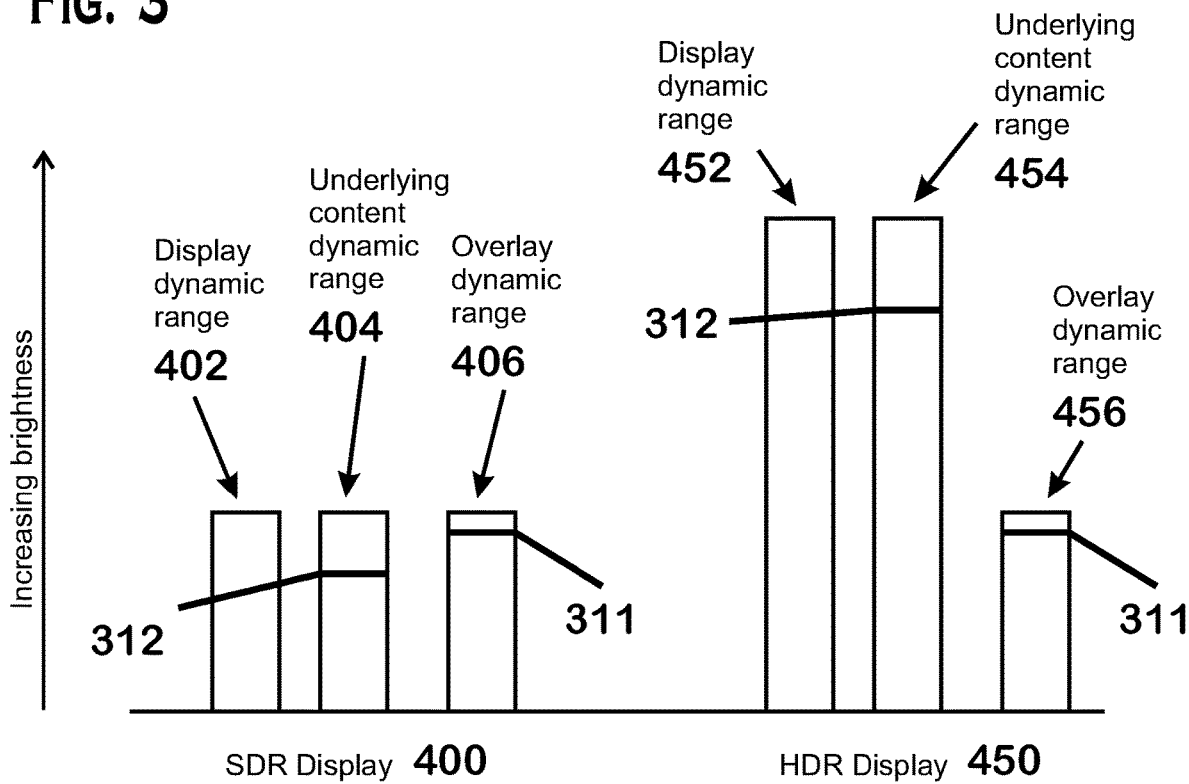
FIG. 4A
FIG. 4B

METHOD AND SYSTEM FOR IMPROVED VISIBILITY IN BLENDED LAYERS FOR HIGH DYNAMIC RANGE DISPLAYS

CROSS REFERENCE TO RELATED APPLICATIONS

This application is a continuation of U.S. patent application Ser. No. 17/069,523, filed on Oct. 13, 2020, which is incorporated by reference as if fully set forth herein, which claims the benefit of U.S. patent application Ser. No. 16/218,708 filed on Dec. 13, 2018, which is incorporated by reference herein in its entirety.

BACKGROUND

High dynamic range ("HDR") displays provide more pleasing visual experiences by increasing the ratio between maximum and minimum brightnesses as compared to standard dynamic range ("SDR") displays. Improvements related to HDR displays are constantly being made.

BRIEF DESCRIPTION OF THE DRAWINGS

A more detailed understanding may be had from the following description, given by way of example in conjunction with the accompanying drawings wherein:

FIG. 3 is a diagram illustrating an underlying content layer and an overlay content layer, according to an example;

FIGS. 4A-4B illustrate comparative dynamic ranges of a display, an underlying content layer, and an overlay content layer, according to an example.

DETAILED DESCRIPTION

Described herein are techniques for improving visibility in blended layers. Specifically, there are many instances where a standard dynamic range ("SDR") overlay is displayed over high dynamic range ("HDR") content on HDR displays. In an example, HDR video content is provided to a cable television set-top box, which adds a guide and menus. Because the overlay is SDR, the maximum brightness of the overlay is much lower than the maximum brightness of the HDR content, which can lead to the SDR elements being obscured if those elements have at least some transparency (e.g., an alpha value substantially lower than 1.0). To help with this situation, the present disclosure provides techniques including modifying the luminance of either or both of the HDR and SDR content when an SDR layer with some transparency is displayed over HDR content. A variety of techniques are provided. In one example, a fixed adjustment is applied to pixels of one or both of the SDR layer and the HDR layer. The fixed adjustment comprises decreasing the luminance of the HDR layer and/or increasing the luminance of the SDR layer. In another example, a variable adjustment is applied. The variable adjustment is based on a comparison between a characteristic value of a particular pixel with a statistical result derived from multiple pixels. The term "characteristic value" refers to any value that characterizes a pixel. Examples of characteristic values include alpha values, luminance values, average color values (or other functions of color values), or any other value that characterizes a pixel. In an example, a mean is taken of the alpha value of all pixels in the SDR layer. An adjustment is made to each pixel, where the adjustment for a pixel is based on a comparison of the alpha value of the pixel to the mean. Many other techniques are disclosed herein.

Figure 1:
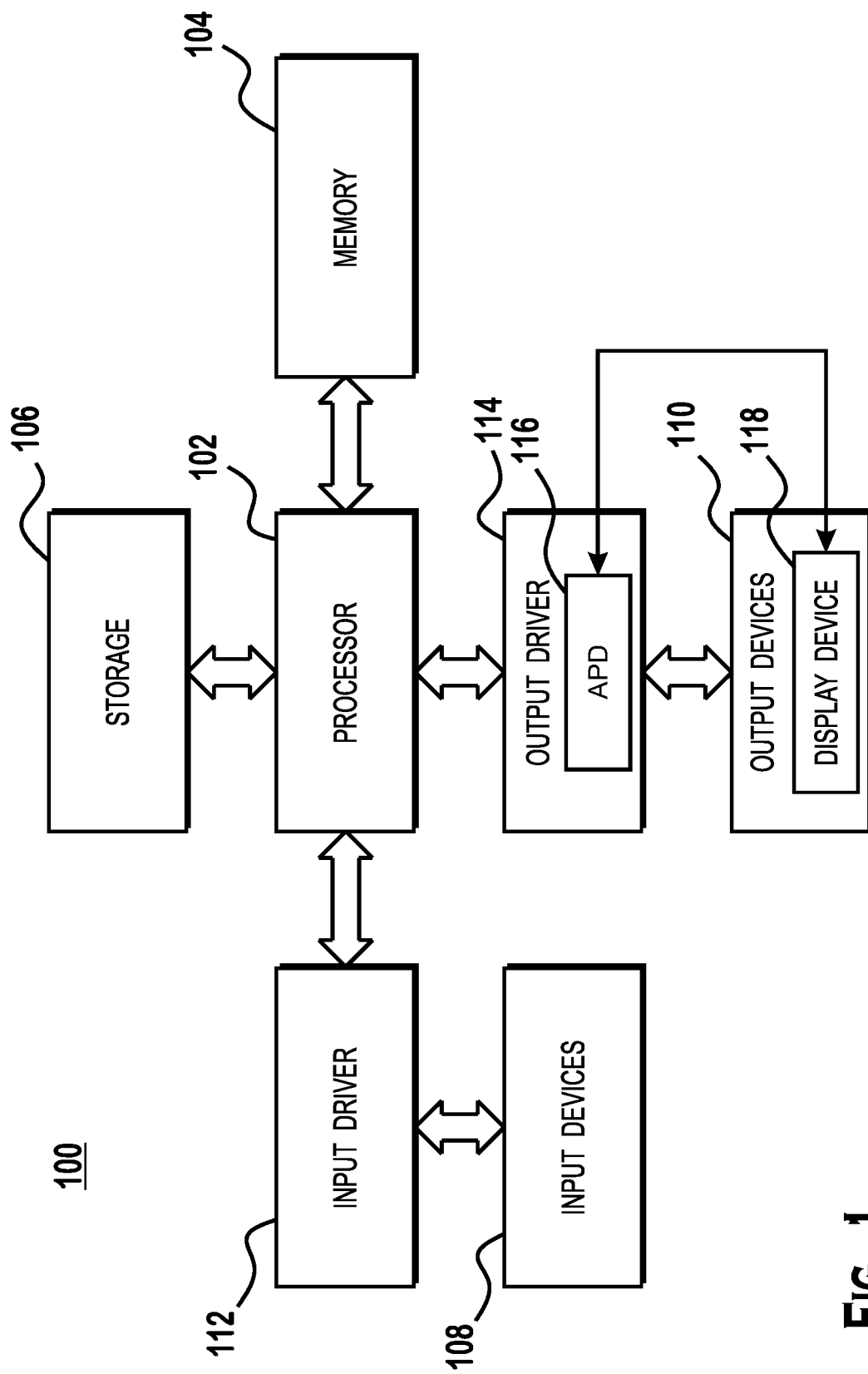
FIG. 1 is a block diagram of an example device in accordance with certain implementations.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a mouse, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display.

Figure 2:
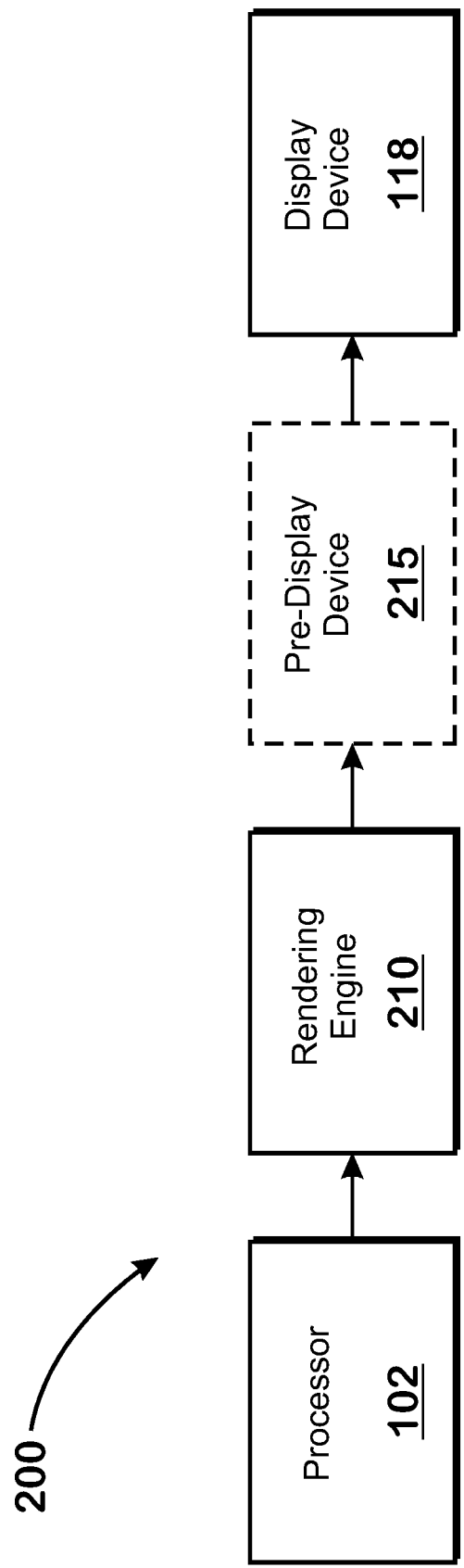
FIG. 2 is a block diagram illustrating aspects of the device of FIG. 1, according to an example.

FIG. 2 is a simplified block diagram of an example system 200, in which one or more features of the disclosure can be implemented. System 200 includes a processor 102 in communication with a rendering engine 210 which collectively provide image data to a pre-display device 215. The optional pre-display device 215 reads the image data, optionally modifies pixel data derived from the image data according to one or more techniques, and outputs the modified pixel data to a display device 118 for display. The system 200 represents one of a variety of devices that cause graphics to be displayed on a screen.

In one example, the system 200 is a home computing device such as a desktop, laptop, tablet computer, smart phone, video game console, or other device. The processor 102 is a main processor (e.g., central processing unit ("CPU")) of the device. In such a system, the processor 102 provides commands and data to the rendering engine 210. The rendering engine 210 represents dedicated or integrated graphics rendering hardware. The rendering engine 210 generates pixel output for display on the display device 118. The commands and data for the rendering engine 210 instruct the rendering engine 210 to render frames based on two-dimensional or three-dimensional objects. The commands and data also specify an overlay for display on the display device 118, which the rendering engine 210 combines with the rendered frames to generate a final output for display on the display device 118. In such a situation, no pre-display device 215 is present.

In another example where the system 200 is a home computing device, the rendering engine 210 includes a video decoder that decodes video data for display. The processor 102 issues commands to the video decoder to decode video data. A pre-display device 215 is a video post-processing engine that adds an overlay for display on the display device 118.

In another example, the system 200 is a video content server connected over the internet and through the pre-display device 215 to the display device 118. In such a system, the processor 102 and the rendering engine 210 work in conjunction to provide pixel data for display on the display device 118. The pre-display device 215 is a set-top box or other media player that receives the video data, adds an overlay, and outputs the resulting combined image frames to the display device 118 for display.

In another example, the system 200 is a compound system that includes a display system that is connected to a video content provider system that provides video content to the display system. In such an example, the display system includes the display device 118 and the pre-display device 215, whose role is to generate an overlay and composite the overlay with video content received from the video content provider system. Examples of the content provider system is a streaming desktop computer or an internet video content server. An example of the display system is a smart television or a non-smart television that includes the pre-display device 215.

Although some examples of the system 200 are described, it should be understood that the system 200 may represent any other type of computing device that receives or generates underlying image content for display and combines that underlying image content with an overlay for display on a display device 118.

It is possible for the graphics of the overlay layer to be transparently composited with the underlying content layer. A value, typically referred to as "alpha," specifies the opacity of the overlay layer. In other words, the alpha value specifies the degree to which the color of the overlay layer contributes to final color value of a blended pixel. By convention, an alpha value of 1.0 indicates that the overlay layer is opaque and that therefore, the final color value would be the color provided by the overlay layer, which is unmodified by the underlying content layer. An alpha value of 0.0 indicates that the overlay layer is completely transparent and makes no contribution to the final color value. An alpha value of 0.5 indicates that both the underlying content and the overlay layer contribute to a substantial degree to the final pixel value.

Display devices like display device 118 have an inherent dynamic range. The dynamic range specifies the ratio between the highest brightness and the lowest brightness that the display is capable of producing. Traditional displays are considered to have a "standard" dynamic range ("SDR"). Although the actual dynamic range of different displays varies, the output from typical applications is usually tone mapped to an SDR range. Tone mapping is a technique for mapping the brightnesses of pixels output by a content generator (e.g., by the rendering engine 210) to actual brightness values that are output by a display. Typically, tone mapping is done to approximate the intended appearance of an image despite the limitations of display.

High dynamic range ("HDR") displays have the capability to display a much greater range of brightnesses than SDR displays. In addition, the maximum brightness of HDR displays is much greater than the maximum brightness of SDR displays (for example, 1000 nits for an HDR display versus 300 nits for an SDR display). However, to use the full dynamic range of HDR displays, content that is to be displayed on HDR displays needs to be designated as HDR content, which has a much greater dynamic range than SDR content. SDR content displayed on an HDR display will not be mapped to the full range of the display but will instead be mapped to a dimmer portion of the dynamic range of the HDR display. SDR content is "mapped down" in this manner because of the greater brightness of HDR displays as compared with SDR displays. More specifically, HDR content typically includes a "highlight range" that comprises the upper portion of the HDR range. This highlight range is used for highlights (such as specular highlights) in HDR content and is typically mapped to the highest brightnesses of HDR displays. However, SDR content does not include this highlight range and uses the upper portion of the SDR range in a much more general purpose manner. If SDR content were mapped to the entire HDR range, then much of the SDR content would be in the highlight range of the HDR display, which would be too bright. Thus instead of mapping SDR content to the entire range of an HDR display, SDR content is mapped to a much lower range. In an example, SDR content is mapped to the brightness range of an SDR display, even when displayed on an HDR display, so that the SDR content will appear on the HDR display approximately as it does on an SDR display.

There are issues with displaying content that includes a combination of HDR and SDR content. More specifically, as described above, SDR content is tone mapped such that the maximum brightness of the SDR content is lower than the maximum brightness of both the HDR content and of the display itself. This mapping can result in a situation in which an SDR overlay becomes obscured (distorted or unviewable) due to being much less bright than the underlying image content. Note, the SDR overlay, if overlaid on SDR content on an SDR display, would be much more visible due to having comparable brightnesses to the SDR content. However, on an HDR display, the SDR overlay is overpowered by the HDR content, which is brighter.

FIGS. 3 and 4A-4B illustrate a situation in which an SDR overlay is present over a content layer. FIG. 3 illustrates a screen 300 that has an underlying content layer 305, for which one object 312 is illustrated. Although more objects may actually be present in the content layer, only one is shown for clarity of illustration. In addition, an overlay content layer 310 is illustrated. The overlay content layer 310 includes an overlay content layer 311 that at least partially overlaps with the underlying content layer object 312.

FIG. 4A illustrates, for an SDR display, comparative dynamic ranges of the display on which the screen 300 is shown, the underlying content layer 305, and the overlay content layer 310. Because the display is an SDR display, the display dynamic range 402, the underlying content dynamic range 404, and the overlay dynamic range 406 are roughly the same. The bright object 312 in the underlying content has a slightly lower brightness level than the overlay object 311 and thus the overlay object 311 will likely not be obscured by the bright object 312 even if the overlay object 311 is displayed with alpha blending.

FIG. 4B illustrates, for an HDR display, comparative dynamic ranges of the display on which the screen 300 is shown, the underlying content layer 305, and the overlay content layer 310. Because the display is an HDR display, the display dynamic range 452 is much greater than the SDR display dynamic range 402. Further, the underlying content provided to the display is also HDR and has the same dynamic range as the display. However, because the overlay dynamic range is not HDR, but is instead SDR, the overlay dynamic range is much lower than the display dynamic range 452. Further, the maximum brightness of the overlay dynamic range 456 is much lower than the maximum brightness of the display dynamic range 452. Because the underlying content dynamic range 454 is HDR, the bright object 312 in the underlying content has a brightness that is much greater than that of the overlay object 311. For this reason, if the overlay object 311 is substantially transparent (e.g., has an alpha value substantially lower than 1.0), then that overlay object 311 will be obscured by the bright object 312 of the underlying content layer 305. Note, the lines representing the overlay object 311 and the bright object in the SDR display 400 diagram and the HDR display diagram 450 represent the maximum brightness for those respective objects. It should be understood that the dynamic range of the HDR content 454 does not have to be exactly the same as the dynamic range of the display 452.

Figure 5:
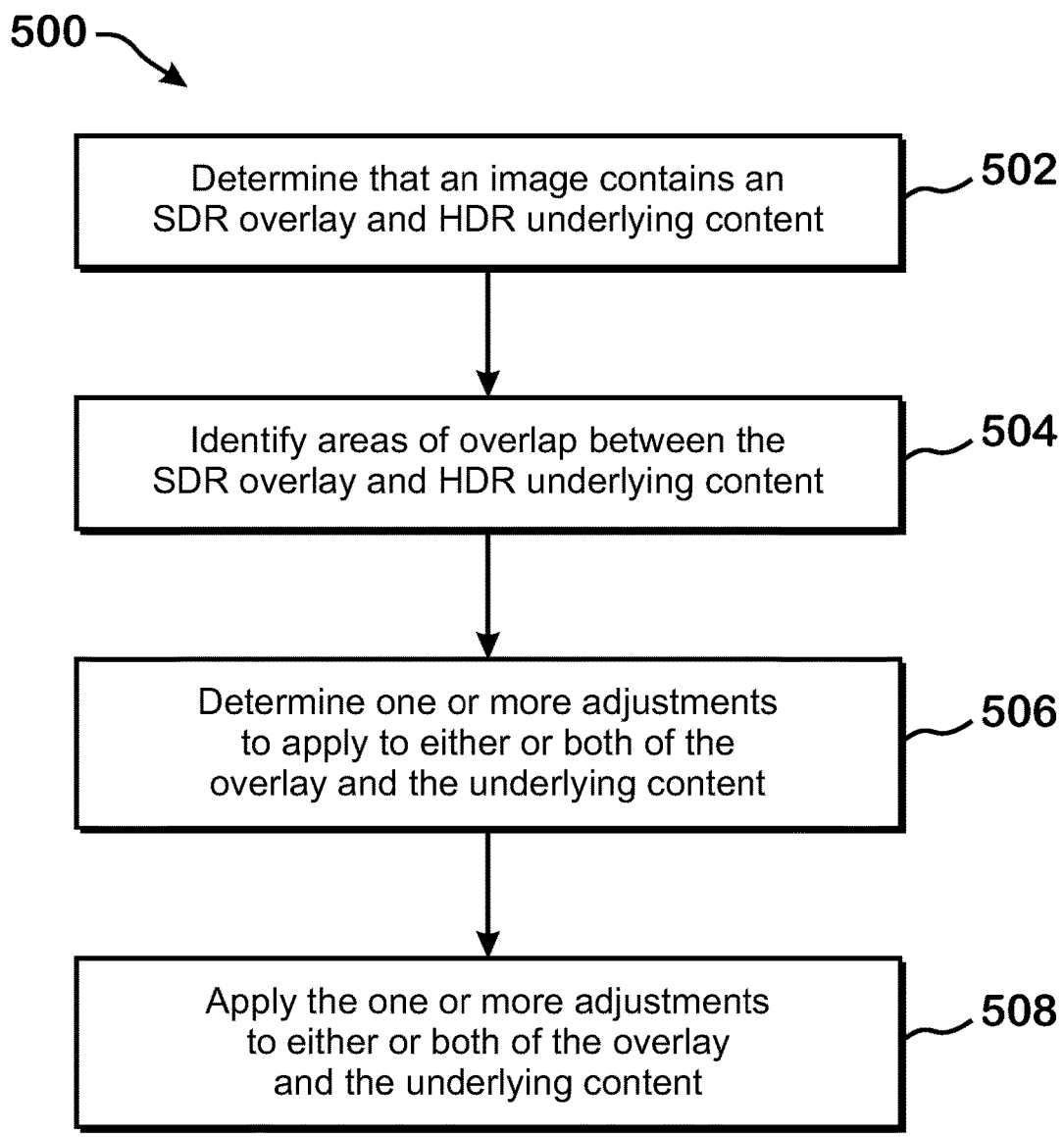
FIG. 5 is a flow diagram of a method for applying adjustments to an image, according to an example.

For the above reason, a technique is provided to adjust the brightness values of at least a portion of a composited image that includes both an underlying HDR content layer and an SDR overlay, where the composited image is to be displayed on an HDR display. Specifically, FIG. 5 is a flow diagram of a method 500 for adjusting a frame that includes HDR content with an SDR overlay, according to an example. Although described with respect to the system of FIGS. 1-3 and 4A-4B, it should be understood that any system that performs the steps of method 500 in any technically feasible order falls in the scope of the present disclosure.

The method 500 is performed by a compositor or by another unit different than the compositor, which may be a part of a processor 102 (e.g., as a hardware module or a software module executing on the processor 102), a part of the rendering engine 210 (e.g., as a post-processing hardware or software module), a part of the pre-display device 215 (e.g., as a hardware or software module), or a part of the display device 118 (e.g., again, as a hardware or software module). A tone mapper first processes content to map the brightnesses defined in the content to brightnesses of a display. As described above, SDR content is mapped to an SDR dynamic range and HDR content is mapped to a greater, HDR dynamic range. When compositing is required, such as in the situation an SDR overlay is to be displayed over HDR content, a compositor blends the SDR and HDR content according to the alpha values of the SDR overlay. The compositor may be a software or hardware component located in any of the units described above or in another unit not described. To overcome the difficulties associated with an SDR overlay having lower maximum brightness than HDR underlying content, the compositor performs the method 500 when compositing the HDR and SDR content. The compositor optionally analyzes one or more characteristic values of pixels of input content, (where input content includes underlying content as well as overlay content), and (in at least some situations) adjusts the brightnesses of one or more pixels of one or both of the underlying content and the overlay content such that, when blended, the overlay content has a different appearance than if no adjustments were made and the underlying content and overlay content were blended. This modification helps to improve contrast between SDR overlay and HDR underlying content so that the SDR overlay is more visible to a viewer. The term "characteristic value" refers to any value that characterizes a pixel. Examples of characteristic values include alpha values, luminance values, average color values (or other functions of color values), or any other value that characterizes a pixel.

The method 500 begins at step 502, where the compositor determines that an image to be displayed on the display device 118 includes HDR underlying content and an SDR overlay. Examples of situations including HDR underlying content and an SDR overlay include a rendered three-dimensional image (the underlying content) that is rendered in HDR and an SDR overlay generated by, for example, one or more of the processor 102 at the request of an application, operating system, device driver, or other hardware or software module, the rendering engine 210, or the pre-display device 215, HDR television content delivered over a cable television network where a set-top box provides SDR menus to be displayed over the HDR television content, or a media player (e.g., blu-ray player) that displays HDR content from a physical media and also displays SDR menus, text, and/or graphics over the HDR content from the physical media. Although these examples are described, these examples should not be taken to be limiting.

At step 504, the compositor identifies areas of overlap between the HDR underlying content and the SDR overlay. These areas include pixels that are covered by both the SDR overlay and the HDR underlying content. If any portion of the SDR overlay is not completely opaque (e.g., has an alpha value of less than 1.0), then that SDR overlay will be displayed with at least some contribution from the underlying HDR content.

At step 506, the compositor determines one or more adjustments to apply to either or both of the SDR overlay and the HDR underlying content. A large variety of adjustments are possible and will be discussed in further detail below. At step 508, the compositor applies the one or more adjustments to either or both of the overlay and the underlying content. After the method 500, the SDR overlay and HDR underlying content are composited to form a final image, which is then displayed on the display 118.

Example adjustments to be applied by the compositor are now described. In one example, the compositor applies a fixed adjustment to pixels of one or more of the HDR underlying content and the SDR overlay. In some examples, this fixed adjustment includes one or more of adding or subtracting a fixed value to the luminance of the HDR underlying content pixels, multiplying the luminance of the HDR underlying content pixels by a fixed value (e.g., either a reducing value like a value between 0 and 1 or an increasing value like a value greater than 1), adding or subtracting a fixed value to the luminance of the SDR overlay, multiplying the luminance of the SDR overlay by a fixed value (e.g., either a reducing value like a value between 0 and 1 or an increasing value like a value that is greater than 1), and clipping a luminance of the HDR layer. One or more of the above adjustments may be applied alone or in combination. Clipping is an adjustment that sets a maximum luminance value for the underlying HDR content. To apply a clipping adjustment, if the luminance value of a pixel is above the maximum, the luminance value is set to the maximum value, and no clipping adjustment is applied if the luminance value of the pixel is below or equal to the maximum. In some examples, other adjustments (e.g., multiplication and/or addition) are first applied to luminance values of pixels and then the resulting value is clipped to a maximum value if necessary. Clipping may also be used alone, without any other adjustments. In one example, all pixels in an overlap area (the pixels in the area of overlap between the HDR content and the SDR content) have their luminances reduced through either or both of multiplication and addition. The resulting values that are over the clipping maximum are then reduced further, either through being set to the maximum value or through a further luminance value reduction (e.g., by multiplying from a value between 0 and 1), followed by a clipping operation, wherein values that remain over the clipping maximum are set to the maximum value.

In some implementations, clipping is applied in a more complex way. More specifically, clipping maximums can be set for red, green, and blue components of pixels, and applied independently. In some implementations, only one or two of the red, green, or blue components are clipped. Any other technically feasible technique for clipping pixel values may be used.

In some examples, a fixed adjustment includes adding or subtracting a value and the multiplying the result by a scale value. In some examples, an addition or subtraction operation and then a multiplication operation is applied to both the SDR content and the HDR content.

In one example, the fixed adjustment is based on a comparison between the dynamic ranges of the SDR overlay and the HDR underlying content, with a greater disparity resulting in stronger modifications to luminance. In another example, the fixed adjustment is a pre-defined constant value. In another example, the fixed adjustment is user-defined. The manner in which the value of the fixed adjustment is decided should not be read to be limited by the specific examples provided herein.

In another example, the compositor applies adjustments that are content adaptive. Content adaptive adjustments are also referred to as variable adjustments herein. In general, content adaptive adjustments make one or more modifications to luminance values of pixels of either or both of the HDR underlying content and the SDR overlay, where the degree to which the luminance is adjusted is based on an analysis of characteristic values of pixels of either or both of the HDR underlying content and the SDR overlay. Some examples of content adaptive adjustments follow.

In an example of a content adaptive adjustment, the compositor applies a variable adjustment to pixels of one or more of the HDR underlying content and the SDR overlay. In some examples, the variable adjustment includes one or more of adding or subtracting a variable value from the luminance of the HDR underlying content pixels, multiplying the luminance of the HDR underlying content pixels by a variable value (e.g., a reducing value such as a value between 0 and 1 or an increasing value such as a value greater than 1), adding or subtracting a variable value to the luminance of the SDR overlay, or multiplying the luminance of the SDR overlay by a variable value (e.g., a reducing value such as a value between 0 and 1 or an increasing value such as a value that is greater than 1). In any of the above examples, the variable value is based on a characteristic value of one or more pixels of the HDR underlying content and the SDR overlay. Variable adjustments are content adaptive in that the adjustment to be applied is based on some aspect of the pixels of either or both of the SDR overlay or the HDR underlying content.

The above adjustments are referred to in other portions of this disclosure. Adjustments to the SDR overlay pixels that are fixed are referred to collectively as "fixed SDR adjustments." The term "fixed" means that the adjustment does not vary for different pixels in a certain region of the screen (such as the whole screen, a smaller portion of the whole screen, or in the region of overlap between the overlay and the underlying content). These adjustments include the fixed adjustments to the SDR overlay mentioned above. Adjustments to the HDR underlying content that are fixed are referred to collectively as "fixed HDR adjustments." These adjustments include the fixed adjustments to the HDR underlying content mentioned above. Adjustments to SDR content that are variable are referred to herein as "variable SDR adjustments." These adjustments include the variable adjustments to the SDR overlay mentioned above. Adjustments to the HDR underlying content that are variable are referred to collectively as "variable HDR adjustments." These adjustments include the variable adjustments to the HDR underlying content mentioned above. The term "fixed adjustments" refers collectively to fixed SDR adjustments and fixed HDR adjustments. The term "variable adjustments" refers collectively to variable SDR adjustments and variable HDR adjustments. The term "adjustments" herein, when used without any other modifier, refers collectively to both fixed and variable adjustments. In the present disclosure, the term "weaker adjustment" is an adjustment that affects some characteristic of a pixel to a lesser degree than a "stronger adjustment."

In some implementations, adjustments are applied to the pixels for which there is overlap between the SDR overlay and the underlying HDR content and not to pixels for which no such overlap exists. In some examples, a variable adjustment to a particular pixel is based on the characteristic value (or values) of the pixel being adjusted pixel and not on other pixels. In an example, a pixel of the SDR overlay having high transparency (i.e., alpha close to 0) would receive a "stronger adjustment" (e.g., a greater boost to luminance) than a pixel having a low transparency (which would receive a weaker adjustment, such as a lower boost to luminance). In other examples, adjustments applied to pixels are based on an analysis of multiple pixels, which are either all from one layer (e.g., all from the SDR layer or all from the HDR layer) or are from both layers.

The compositor applies fixed adjustments as follows. First, the compositor determines whether a particular pixel is to receive an adjustment. Then the compositor applies a fixed adjustment to that pixel if it is to receive an adjustment. In one example, a determination of whether to apply an adjustment to a pixel occurs by determining whether the characteristic value of the pixel is above or below a threshold. In one example, if an SDR overlay pixel has an alpha value lower than a particular threshold, then the compositor applies a fixed adjustment to that SDR overlay pixel (e.g., by increasing the luminance of that pixel through addition of a fixed value or multiplication by a fixed gain), applies a fixed adjustment to the overlapped pixel of the underlying HDR content layer (e.g., by decreasing the luminance of that pixel by subtracting a fixed value or multiplying by a fixed value that is less than 0) or applies both of these adjustments to the SDR overlay pixel and the HDR content layer pixel.

For variable adjustments for which the adjustment made to any particular pixel is based on an analysis of characteristic values of multiple pixels, the compositor uses a statistical technique to determine whether and to what degree a particular pixel is to receive an adjustment. The statistical technique takes into consideration characteristic values of pixels for which there is overlap between the SDR overlay and the HDR underlying content and produces a statistical result based on those characteristic values. In some implementations, the compositor compares the statistical result to a threshold. If the statistical result is greater than or lower than the threshold, then the compositor applies adjustments to pixels of either or both of the SDR overlay and the HDR underlying content. In addition, in some implementations, the strength of an adjustment made to a pixel is based on a comparison between the characteristic value of that pixel and the statistical result.

In an example of the above, adjustments are made to pixels of the SDR overlay but not to pixels of the HDR underlying content. The compositor calculates a mean of all of the alpha values of the pixels of the SDR overlay and determines that the mean is below a threshold (indicating there is significant transparency). In response to this determination, the compositor determines that adjustments should be applied to the pixels of the SDR overlay. The adjustments made are based on a comparison between the alpha values of the SDR pixels and the calculated average alpha value. For pixels that have a lower alpha than the average value, a greater boost to luminance is applied. For pixels that have a greater alpha than the average value, a lower boost to luminance is applied.

In an example, the compositor determines which adjustments to apply to which pixels based on a more complex statistical technique such as a histogram. According to such a technique, the compositor generates a histogram based on characteristic values for pixels of the SDR overlay, overlapped pixels of the HDR underlying content, or both. The histogram groups characteristic values of pixels into histogram bins that correspond to ranges of characteristic values. Each bin stores the number of values that fall within the range assigned to that bin.

The compositor determines whether and, optionally, to what degree to apply adjustments to pixels of the SDR overlay and/or the HDR underlying content based on the histogram. In one example, a threshold characteristic value exists and the compositor determines the number of pixels for which the characteristic value is above (or below) the threshold using the histogram. For example, if the count for histogram bins above the threshold value is above a count threshold, then the compositor applies an adjustment to one or more pixels of the SDR overlay and/or the HDR underlying content. In an example, the compositor applies variable adjustments to one or more pixels of the SDR overlay and/or the HDR underlying content, where the adjustment to be applied is based on the distribution defined by the histogram. For a histogram having the majority of pixels near the opaque end (e.g., more than a threshold percentage of pixels have an alpha value above an alpha value threshold), the adjustment applied is weaker than for a histogram having the majority of pixels near the transparent end.

In one example, the histogram is a histogram of luminance values for the HDR underlying content. If the histogram indicates that the underlying content is brighter, on average, than a threshold (e.g., a number of pixels for bins above the threshold is greater than a count threshold), then the compositor determines that adjustments should be applied. In an example, the adjustments are stronger if the histogram indicates that the underlying HDR content is brighter and are weaker if the histogram indicates that the underlying HDR content is dimmer.

In an example, the compositor performs steps 506 and 508 in multiple stages. Specifically, each stage is associated with a different spatial pixel scope. In one stage, the compositor determines characteristic values based on one spatial pixel scope and applies adjustments to pixels based on an analysis of those characteristic values. Then in another stage, the compositor determines characteristic values based on a different spatial pixel scope and applies adjustments to the pixels based on an analysis of those characteristic values. Additional stages, where adjustments based on analysis of different spatial pixel scopes are applied, may be performed as well. In some examples, different spatial pixel scopes include global, local, and single pixel. A global pixel scope is one in which pixels from approximately the entire extents of the image are considered in generating characteristic values for analysis. Adjustments are made to certain pixels based on this analysis. For example, an average luminosity of pixels across the entire image may be taken. A local pixel scope is a scope in which pixels around the pixels to which adjustments are made are considered in generating characteristic values for analysis. A single pixel scope is a scope in which characteristic values are derived from the pixel to which adjustments are made. In examples, the compositor applies adjustments to pixels based on characteristic values for one spatial pixel scope, then applies adjustments to pixels based on characteristic values for a different pixel scope.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:

detecting that a composite image is to be generated from a content layer and an overlay layer, wherein the content layer has a first luminance range that is larger than a second luminance range of the overlay layer;

in response to the detecting, applying one or more adjustments to either or both of the content layer and the overlay layer, the adjustments configured to remediate luminance conflicts associated with a difference between the first luminance range and the second luminance range; and combining the content layer and the overlay layer, including the one or more adjustments.

2. The method of claim 1, wherein a maximum luminance of the content layer is higher than a maximum luminance of the overlay layer.

3. The method of claim 1, wherein the one or more adjustments increase contrast between the overlay layer and the content layer.

4. The method of claim 1, wherein the content layer includes a rendered three-dimensional image.

5. The method of claim 1, wherein the adjustments are made within areas of overlap between the content layer and the overlay layer.

6. The method of claim 5, wherein the adjustments are made to pixels having alpha values less than 1.0.

7. The method of claim 1, wherein the adjustments comprise fixed adjustments that are the same for each pixel of one or both of the content layer and the overlay layer.

8. The method of claim 1, wherein the adjustments comprise an adjustment to a pixel of the content layer or the overlay layer, the adjustment including one of multiplication of the pixel by a value, clipping the pixel, or an addition or subtraction of a value to or from the pixels.

9. The method of claim 1, wherein the adjustments comprise variable adjustments that are different for different pixels.

10. A system, comprising:

a memory storing pixels for a content layer and an overlay layer, wherein the content layer has a first luminance range that is larger than a second luminance range of the overlay layer; and circuitry configured to:

detect that a composite image is to be generated from the content layer and the overlay layer;

in response to the detecting, apply one or more adjustments to either or both of the content layer and the overlay layer, the adjustments configured to remediate luminance conflicts associated with a difference between the first luminance range and the second luminance range; and combine the content layer and the overlay layer, including the one or more adjustments.

11. The system of claim 10, wherein a maximum luminance of the content layer is higher than a maximum luminance of the overlay layer.

12. The system of claim 10, wherein the one or more adjustments increase contrast between the overlay layer and the content layer.

13. The system of claim 10, wherein the content layer includes a rendered three-dimensional image.

14. The system of claim 10, wherein the adjustments are made within areas of overlap between the content layer and the overlay layer.

15. The system of claim 14, wherein the adjustments are made to pixels having alpha values less than 1.0.

16. The system of claim 10, wherein the adjustments comprise fixed adjustments that are the same for each pixel.

17. The system of claim 10, wherein the adjustments comprise one of multiplication of a pixel by a value, clipping the pixel, or an addition or subtraction of a value to or from the pixels.

18. The system of claim 10, wherein the adjustments comprise variable adjustments that are different for different pixels.

19. A non-transitory computer-readable medium storing instructions that, when executed by a processor, cause the processor to perform operations comprising:

detecting that a composite image is to be generated from a content layer and an overlay layer, wherein the content layer has a first luminance range that is larger than a second luminance range of the overlay layer;

in response to the detecting, applying one or more adjustments to either or both of the content layer and the overlay layer, the adjustments configured to remediate luminance conflicts associated with a difference between the first luminance range and the second luminance range; and combining the content layer and the overlay layer, including the one or more adjustments.

20. The non-transitory computer-readable medium of claim 19, wherein a maximum luminance of the content layer is higher than a maximum luminance of the overlay layer.

* * * * *